United States Patent Office.

W. L. McCORD, OF ABBEVILLE, SOUTH CAROLINA.

Letters Patent No. 91,954, dated June 29, 1869.

---

IMPROVED MEDICAL COMPOUND.

---

The Schedule referred to in these Letters Patent and making part of the same.

---

To all whom it may concern:

Be it known that I, W. L. McCORD, of Abbeville, in the district of Abbeville, and State of South Carolina, have invented a new and improved Medical Compound; and I do hereby declare that the following is a full, clear, and exact description thereof, which will enable others skilled in the art to make and use the same.

This invention relates to a new and useful medicine for the colic, in horses and other animals; and consists in a compound composed of the ingredients hereinafter named, prepared by combining the ingredients in about the proportions mentioned.

In the use of this medicine, I do not confine myself to horses exclusively, although experience has proved it to be a specific for the colic in that valuable animal.

The remedy may be used for all the purposes to which it is adapted, but is more especially designed for horses.

In carrying out my invention and discovery, I make use of the following ingredients, in about the proportions named, viz:

Four ounces alcohol, one ounce tincture aconite, one ounce asafœtidas.

Having thus described my invention,

What I claim as new, and desire to secure by Letters Patent, is—

The medical compound, composed of the ingredients herein named, and in about the proportions specified, substantially as and for the purposes described.

W. L. McCORD.

Witnesses:
M. McDONALD,
JNO. TAGGART.